United States Patent
Aronowitz

(10) Patent No.: US 7,050,973 B2
(45) Date of Patent: May 23, 2006

(54) SPEAKER RECOGNITION USING DYNAMIC TIME WARP TEMPLATE SPOTTING

(75) Inventor: Hagai Aronowitz, Petah-Tikva (IL)

(73) Assignee: Intel Corporation, Santa Clara, CA (US)

( * ) Notice: Subject to any disclaimer, the term of this patent is extended or adjusted under 35 U.S.C. 154(b) by 703 days.

(21) Appl. No.: 10/128,725

(22) Filed: Apr. 22, 2002

(65) Prior Publication Data

US 2003/0200087 A1 Oct. 23, 2003

(51) Int. Cl.
*G10L 15/00* (2006.01)

(52) U.S. Cl. .................. 704/246; 704/248
(58) Field of Classification Search ............ 704/246, 704/248
See application file for complete search history.

(56) References Cited

U.S. PATENT DOCUMENTS

| | | | | |
|---|---|---|---|---|
| 4,400,788 A | * | 8/1983 | Myers et al. | 704/241 |
| 4,979,212 A | * | 12/1990 | Yamada et al. | 704/234 |
| 5,164,990 A | | 11/1992 | Pazienti et al. | 381/43 |
| 5,794,190 A | | 8/1998 | Linggard et al. | 704/232 |
| 6,182,037 B1 | | 1/2001 | Maes | 704/247 |
| 6,278,972 B1 | | 8/2001 | Bi et al. | 704/248 |
| 6,304,844 B1 | | 10/2001 | Pan et al. | 704/257 |
| 6,321,195 B1 | | 11/2001 | Lee et al. | 704/241 |
| 6,697,779 B1 | * | 2/2004 | Bellegarda et al. | 704/246 |

* cited by examiner

*Primary Examiner*—Daniel Abebe
(74) *Attorney, Agent, or Firm*—Schwegman, Lundberg, Woessner & Kluth, P.A.

(57) ABSTRACT

An improved template spotting technique may be implemented as part of text dependent speaker verification system to authenticate a user of a wireless communication device. This technique may be suitable for use in noisy environments and for wireless communication devices with limited processing power. Endpoints of a test utterance are identified by first computing local distances between test frames and a target template. Accumulated distances are then computed from the local distances. Endpoints of the utterance may be identified when one or more of the accumulated distances is below a predetermined threshold. Once endpoints of a test utterance are identified, a dynamic time warp (DTW) process may be used to determine whether the test utterance matches a training template. One embodiment of the present invention aligns multiple training templates to reduce the probability of failing to verify the identity of a speaker that should have been properly verified.

26 Claims, 2 Drawing Sheets

SPEAKER RECOGNITION USING DYNAMIC TIME WARP TEMPLATE SPOTTING

TECHNICAL FIELD

The present invention pertains to pattern recognition and in one embodiment, to speaker recognition, which may be suitable for use in wireless communication devices.

BACKGROUND

Portable and wireless communication devices have an increased need for security features to restrict use or access of a device to one or more particular users. Speaker recognition has been employed to authenticate a user of such devices. Speaker recognition pertains to recognizing a speaker based on the individual audio information included in an utterance (e.g., speech, voice, or an acoustic signal). Applications of speaker recognition allows the convenient use of the speakers voice for authentication, providing voice-activated dialing, secured banking or shopping, database access, information services, authenticated voice mail, security control for confidential information areas, and controlled remote access to a variety of electronic systems such as computers.

In general, speaker recognition is classified into two broad categories, namely speaker identification and speaker verification. Speaker identification entails determining which registered speaker may have been an author of a particular utterance. On the other hand, speech or speaker verification involves accepting or rejecting the identity claim of a speaker based on the analysis of the particular utterance. In any case, when appropriately deployed, a speaker recognition system converts an utterance, captured by a microphone (e.g., integrated with a portable device such as a wired or wireless phone), into a set of audio indications. The set of audio indications serves as an input to a speech processor to achieve an acceptable understanding of the utterance.

Accurate speech processing of the utterance in a conventional speech or speaker recognition system is a difficult problem, largely because of the many sources of variability associated with the environment of the utterance. For example, a typical speech or speaker recognition system that may perform acceptably in controlled environments, but when used in adverse conditions (e.g., in noisy environments), the performance may deteriorate rather rapidly. This usually happens because noise may contribute to inaccurate speech processing thus compromising reliable identification of the speaker, or alternatively, rejection of imposters in many situations. Thus, while processing speech, a certain level of noise robustness in speech or speaker recognition system may be desirable.

BRIEF DESCRIPTION OF THE DRAWINGS

The appended claims point out different embodiments of the invention with particularity. However, the detailed description presents a more complete understanding of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents.

Despite significant advances in providing noise robustness, inherent mismatch between training and test conditions still pose a major problem, especially for wireless communication devices. One technique that may be employed to compare patterns is known as dynamic time warping (DTW). This technique allows a comparison which is substantially independent of the position or duration of the spectral components in the signal allowing for the alignment of corresponding parts of an utterance. A decision as to which recognizable pattern is present is based on a score determined from the spectral distances between coefficients between a spoken test utterance and target template created during a training process.

One problem with DTW processes is that the endpoints of the test utterance should be known to efficiently perform the DTW process. Determining the endpoints of a test utterance is a lengthy process that consumes significant processing power and is difficult to perform in real time. This is especially difficult in wireless communication devices having limiting processing capabilities where identification of the speaker must be accomplished quickly.

Voice activity detectors (VADs) may be used to help identify and detect endpoints of an utterance. However VADs have difficulty in accurately determining endpoints, especially during the noisy conditions which are common in wireless communications. Another problem with VADs is that they are generally not suitable where on-line, real-time processing is required, as in the case of wireless communications. Furthermore, VADs add significant complexity to the processing system which is particularly undesirable for wireless communication devices.

Without the a priori knowledge of the endpoints of a spoken utterance, a DTW algorithm could be run for all possible endpoints between the test utterance and target utterances. This approach is also generally undesirable for wireless communication devices because it requires significant processing time and is difficult to perform in real-time to authenticate a user. Furthermore, this technique requires a large amount of memory and consumes a large amount of power.

Figure 1:
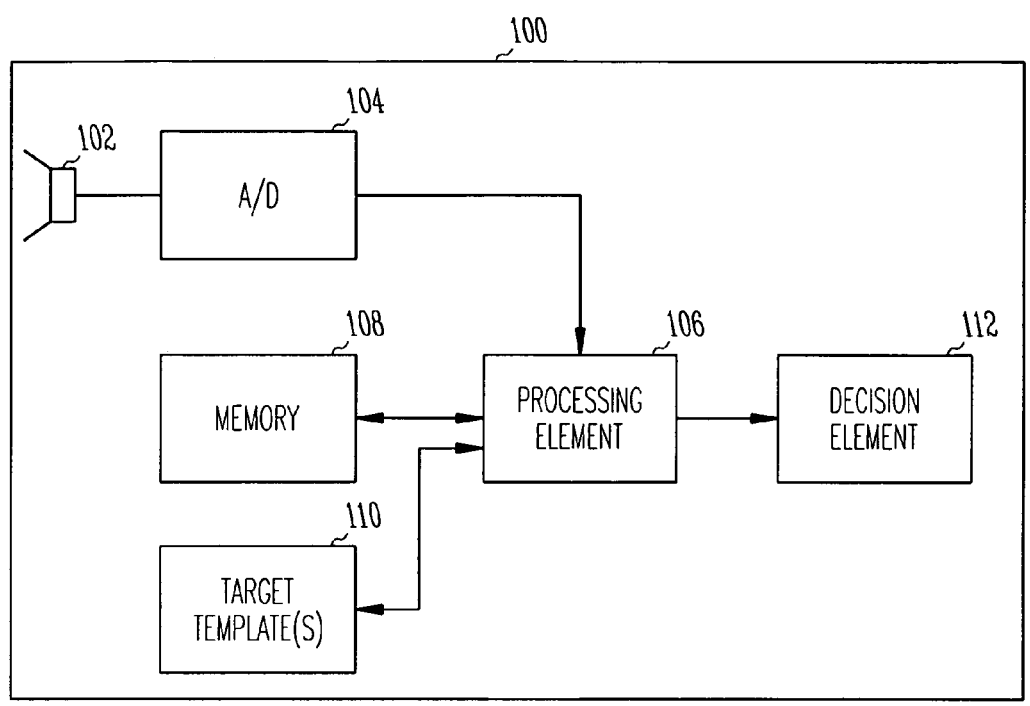
FIG. 1 is a functional block diagram of a speaker recognition system in accordance with an embodiment of the present invention.

The present invention pertains to pattern recognition, and in one embodiment, to speech and speaker recognition including speaker verification identification which may be suitable for use in wireless communication devices. FIG. 1 is a functional block diagram of a speaker recognition system in accordance with an embodiment of the present invention. Speaker verification system 100 may authenticate a user, and for example, restrict access to a wireless communication device or certain features of the device. System 100 may also be used to secure private information on or accessible through a wireless communication device. System 100, may be included as part of a wireless communication device. Although the present invention is applicable to almost any communication device, the advantages of the present invention are particularly applicable to wireless, handheld and portable communication devices. By way of example, wireless, handheld and portable communication devices may include wireless and cellular telephones, smart phones, personal digital assistants (PDAs), web-tablets and any device that may provide wireless access to a network such as an intranet or the internet. Accordingly, only a portion of the elements of system 100 are illustrated.

System 100 includes element 102 which receives spoken utterances from a user and converts the utterances to analog signals. Analog to digital converter 104 converts the analog signals to digital signals, and may include voice encoding functionality. The digital signals are processed by processing element 106 to, among other things, identify endpoints of target utterances and generate target templates for the test utterances as described herein. Memory 108 may store processing instructions and data for use by processing element 106. Target templates may be stored in memory 108. Decision element 112 may be responsive to a decision by processing element 106 depending on whether a speaker's identity has been verified. For example, decision element may grant a user use of the wireless communication device or, for example, access to certain features or secure information accessible through the device.

An utterance is a spoken word and may be comprised of portions of silence and portions of noise along with the spoken word. A target utterance refers to an utterance which is to be matched to and serve as a reference. A test utterance, on the other hand, is an utterance which is received from a user and analyzed to determine if it matches the target utterance. Endpoints of an utterance refer to points in time that may identify the beginning and end of the utterance within the captured speech signal. Knowing the end points may allow for the separation of silence and/or noise from the utterance. For example, when an utterance is segmented into frames, the endpoints may refer to specific frames indicating a beginning and an ending of the utterance. Endpoints may also refer to specific frames indicating beginnings and endings of syllables of the utterance. A template, as used herein, may refer to a portion of an utterance with the silence and/or noise removed and may be the portion of an utterance between endpoints. In other words, information pertinent to comparison of utterances may be primarily contained in a template.

Although system 100 is illustrated with one function processing element, processing element 106 may be comprised of several processing elements, or may be comprised of one or more digital signal processors (DSPs). In one embodiment, processing element 106 may identify endpoints of a test utterance by first computing local distances. A distance refers to a spectral distance and as used herein may refer to a spectral difference value between respective spectral values of pairs of frames. Frames that comprise an utterance may be represented in the frequency domain by a vector of several spectral values. The spectral distance refers to a difference between the corresponding spectral values of two frames and may also be represented by a vector comprised of several spectral values. In one embodiment, a local distance is the spectral distance between the corresponding spectral components of test frames and a target template.

Once the local distances are computed, processing element 106 may compute accumulated distances from the local distances. The accumulated distances may be used to identify the endpoints of the test utterance to identify (e.g., spot) the test template. The accumulated distances may be dynamic time warp (DTW) accumulated distances. Processing element 106 may identify endpoints of the test utterance when one or more of the accumulated distances is below a predetermined threshold. In one embodiment, once endpoints of a test utterance are identified, a DTW process may determine whether the test utterance, represented by the test template matches a training sequence, corresponds with a training template. Accordingly, decision element 112 may restrict access to a device or secure information to authorized users. The embodiments of the present invention may reduce run time, processing requirements, and delay between the uttered speech and the response. In one embodiment of the present invention, the use of several training templates are used which may reduce the probability of failing to verify the identity of a speaker that should have been properly verified.

Figure 2:
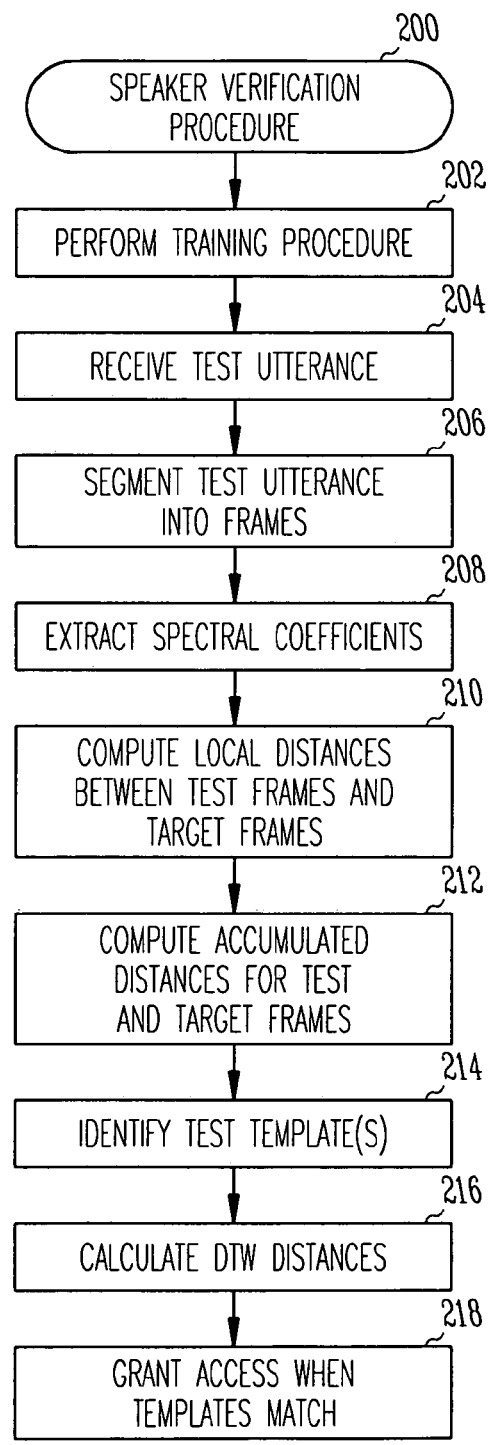
FIG. 2 is a flow chart of a speaker verification process in accordance with an embodiment of the present invention.

FIG. 2 is a flow chart of a speaker verification process in accordance with an embodiment of the present invention. Procedure 200 may identify endpoints of an utterance in a speaker identification system. This may be referred to as template spotting. Procedure 200 may also be used for speaker verification and speaker identification. In one embodiment, procedure 200 may be performed by a wireless communication device that includes, for example, system 100 (FIG. 1) to verify a user's identity. Procedure 200 may also be used to secure private information. In one embodiment, procedure 200 identifies the endpoints of the utterance within the test frames to identify (e.g., spot) a test template, and a DTW process is performed between the identified test template and target template. Although the individual operations of procedure 200 are illustrated and described as separate operations, one or more of the individual operations may be performed concurrently and nothing requires that the operations be performed in the order illustrated.

Operation 202 performs a training procedure to generate training data. The training data may be comprised of feature vectors generated from one or more target words spoken by a user. The target words may be predetermined, and the training data may be in the form of a sequence of feature vectors generated by one of several parameter extraction processes. The feature vectors, for example, may be represented by spectral coefficients. In one embodiment, operation 202 may also include using a voice activity detector (VAD) to identify endpoints of the target words prior to the extraction of the feature vectors. Operation 202, in general, is performed off-line (e.g., not in real time) and accordingly, the time required to find the endpoints of the target words is not of great concern. Upon the completion of operation 202, one or more target templates are generated and may be stored in the device. A target template may include between one hundred and three hundred frames, for example, which may exclude periods of silence and/or noise. Processing element 106 (FIG. 1) may perform operation 202 storing the target templates in memory 108.

Operation 204 receives a test utterance. The test utterance may be one or more predetermined words or phrases which may be spoken in response to a prompt from the device. Elements 102 and 104 of device 100 (FIG. 1) may perform operation 204, and operations 206 through 216 may be performed by processing element 106 (FIG. 1).

Operation 206 segments the test utterance into frames. Each frame may, for example, have a predetermined length. The number of frames of a test utterance, for example, may range between one hundred and five hundred. The frames may include silence and/or noise, and the endpoints of the test utterance are not known.

Operation 208 extracts spectral coefficients from the frames that comprise the test utterance to generate one or more feature vectors for each frame of the test utterance. The feature vectors may be comprised of spectral coefficients, or other coefficients that represent the spectral content of a frame. At the completion of operation 208, a sequence of feature vectors representative of the test utterance is generated and may be stored in the device. Operation 208 converts the utterance from the time domain to the frequency domain. In one embodiment, operation 208 may include performing a discrete Fourier transform (DFT).

Operation 210 computes local distances between the test frames and the target template. In one embodiment, a local distance matrix L may be generated between the feature vectors of each test frame and the feature vectors of each frame of the target template. For example, when the test utterance is comprised of i frames represented by i feature vectors, and when the target template is comprised of j frames represented by j corresponding feature vectors, operation 210 may comprise computing a spectral difference between each test vector i and each target vector j to generate local distance matrix L comprised of i×j vectors. Each element of matrix L may be referred to as $L_{i,j}$.

Operation 212 calculates accumulated distances from the local distances (L). The accumulated distances may be DTW accumulated distances and may be referred to as scores for the possible combinations of frames of the target template and the test frames. In one embodiment, the accumulated distances may be calculated by projecting the test frames onto the target template. In one embodiment, an i×j matrix (D) of accumulated distances is calculated using the following equation:

$$D_{i,j} = \min\{D_{i-1,j-1} + L_{i,j}, D_{i-1,j-2} + (L_{i,j} + L_{i,j-1}) * w, D_{i-2,j-1} + L_{i,j} + L_{i-1,j}\}$$

Calculating accumulated distances is a recursive process used to avoid unrealistic paths and may be implemented by dynamic programming. The use of a minimum (min) function to calculate accumulated distances D may allow a accumulated distance $D_{i,j}$ to be a sum of elements from L along an optimal alignment of the test frames to the target frames. This asymmetric property of this equation may result in a "projection" of the test frames to the target template. Although the accumulated distances $D_{i,j}$ are a sum of elements from the L matrix over an optimal alignment, the accumulated distances $D_{i,j}$ may be viewed as a distance measure because the L matrix includes the subtracted terms.

Any one or more of the terms may be weighted by a weighting factor. The weighting factor may be proportional to a length of a projection to the target template. For example, weighting factor w may range between zero and one or greater. $D_{0,0}$ and other terms such as $D_{0,-1}$ and $D_{-1,-0}$ may be initialized at zero. Upon the completion of operation 212, matrix $D_{i,j}$ of accumulated distances has been generated. This time normalization process helps identify a path whose accumulated distance is a minimum.

Operation 214 identifies possible endpoints of the test utterance by identifying accumulated distances below a predetermined threshold. In one embodiment, each frame i in the test sequence may be within the test template when the next accumulated distance is below the threshold. In other words, frames up to and including frame i may be in the test template when the score for the next frame is below the threshold. For example, if $D_{i,m}$ is below the threshold, frame m is an endpoint of the training template. Accordingly, operation 214 determines the test template by identifying the endpoints of the test utterance. The test template may comprise the test frames which include the test utterance and may exclude test frames comprised of noise and/or silence. Operation 214 may include identifying one or more test templates for one or more test utterances or words. Once the test template is identified, a DTW process can be efficiently employed to compare the test template with the target template.

Operation 216 performs a dynamic time warping (DTW) process on one or more test templates and one or more of the target templates and DTW distances may be calculated to generate a set of scores for the one or more test words or utterances. The greater the distances, the less likely it is that a test template corresponds to a target template.

One reason that this process is successful in determining the endpoints is that the length of the target sequence is known, while the length of a matching test sequence is not known. The DTW process may normalize the final scores with a quantity that is a function of the test sequence length. The variability of the test sequence length is what makes it difficult for simple dynamic programming to solve this template spotting problem efficiently.

Operation 218 verifies a user's identity. For example, when the scores for a test template (i.e., from the test utterance) are below a predetermined threshold, the test utterance may be a good match for one of the target words and, for example, the user's identity may be verified. In one embodiment, a user may be allowed access to a wireless communication device, and/or to certain private information accessible through device. Operation 218 may be performed, for example, by processing element 106 and decision element 112 (FIG. 1).

In one embodiment of the present invention, the use of several training templates may be used to help reduce the probability of failing to verify the identity of a speaker that should have been properly verified. In this embodiment, the problem of computing a distance measure between several sequences is addressed. The training set may comprise a set of training templates representing a single class such as specific spoken words of a specific speaker.

Conventionally, distances are desirably computed between each of the training sets and the test template. When the size of the training set is large, statistical models such as hidden Markov models (HMM) are conventionally used. When the training set is small, some distance measured between two templates may be defined such as the DTW distance for speech recognition. The final distance measure between the test template and the training (i.e., target) set may be a function of the distances between the test template and each training template. When matching the test template to multiple training templates, there may be mismatch which may be located at specific locations within the training templates. For example, a mismatch between a test template and a first training template may be primarily located near the beginning of the first training template, while a mismatch between the test template and a second training template may be primarily located near the middle of the second training template. Matching the test template independently to each training template may result in considerable mismatch for each training template. This may result in the improper rejection of a speaker that should have been verified. This embodiment of the present invention exploits the fact that parts of the test template match corresponding parts of at least one of the training templates.

In this embodiment, the multiple training templates are aligned as part of operation 210 using an alignment algorithm. For example, a DTW algorithm may be used to align all templates to the first of the training templates using an original DTW distance measure. A variant of the DTW algorithm may be used to match the test template and the training templates. When the DTW local distances are computed (e.g., operation 210), $L_{ij}$ may be computed as a function of the local distances between vector i of the test template and vector j of the first training template. A minimum function may be used. All vectors in the other training templates may be aligned to vector j. The accumulated distance table may then be computed according to the DTW algorithm of operation 216, resulting in a distance measure between the test template and the training set of templates. One embodiment may be suitable in matching DNA sequences where the distances may be the edit distance for DNA matching.

The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and broad scope of the appended claims.

What is claimed is:

1. A method of identifying a speaker comprising:
    identifying endpoints of a predetermined utterance to define a test template by:
    computing accumulated distances from local distances between test frames of the utterance and a target template; and
    identifying one or more accumulated distances below a predetermined threshold to identify the endpoints
    wherein the local distances comprise spectral differences between spectral components of the test frames and the target template,
    wherein each accumulated distance is calculated by a recursive process which selects a minimum accumulated distance from sums of a prior calculated accumulated distance and one or more of the local distances, and
    wherein after defining the test template. the method of identifying the speaker comprises performing a time warping process on the test template and the target template to authenticate the speaker.

2. The method of claim 1 further comprising computing the local distances by computing a spectral difference between vectors comprising spectral components of the test frames and vectors comprising spectral components of the target template.

3. The method of claim 2 wherein the test utterance is comprised of i frames represented by i feature vectors, wherein the target template is comprised of j feature vectors, and wherein computing local distances comprises computing a spectral difference between corresponding spectral components each vector i and each vector j to generate a i×j local distance matrix L.

4. The method of claim 2 wherein performing the time warping process includes performing a dynamic time warping (DTW) process between the vectors of the target template and vectors of the test template to generate a score, and the method further includes authenticating the speaker when the score is smaller than a predetermined threshold.

5. The method of claim 4 wherein the utterance is spoken into a wireless communication device by an unidentified user, and wherein the method further comprises determining when the score is greater than the predetermined threshold.

6. The method of claim 5 further comprising granting the unidentified user access to the wireless communication device when the score is greater than the predetermined threshold.

7. The method of claim 6 wherein the utterance is spoken by unidentified user in response to a prompt from the wireless communication device, the prompt indicating a particular word for the unidentified user to speak.

8. The method of claim 1 further comprising extracting spectral coefficients from each test frame of the utterance to generate a sequence of vectors comprised of spectral components.

9. The method of claim 8 further comprising prior to extracting, segmenting the utterance into a plurality of the test frames.

10. The method of claim 1 further comprising performing a training process to generate the target template, the training processing comprising utilizing a voice activity detection (VAD) algorithm to identify endpoints for the target template.

11. The method of claim 1 further comprising aligning each of multiple target templates to a first target template, and wherein computing local distances comprises:
    computing local distances between each of the test frames and corresponding frames of the aligned target templates; and
    selecting a minimum of the local distances for each of the target templates.

12. A method of identifying a speaker comprising:
    computing local distances by computing a spectral difference between vectors comprising spectral components of test frames and vectors comprising spectral components of a target template;
    computing accumulated distances from the local distances between the test frames and the target template;
    identifying one or more accumulated distances below a predetermined threshold to identify endpoints of an utterance within the test frames to define a test template; and
    performing a time warping process on the test template and target template to authenticate the speaker,
    wherein the test utterance is comprised of i frames represented by i feature vectors, wherein the target template is comprised of i feature vectors, and wherein computing local distances comprises computing a spectral difference between corresponding spectral components each vector i and each vector j to generate a i×j local distance matrix L, and
    wherein computing accumulated distances comprises computing a i×j accumulated distance matrix D substantially in accordance with the following equation:

$$D_{i,j} = \min\{D_{i-1,j-1} + L_{i,j}, D_{i-1,j-2} + (L_{i,j} + L_{i,j-1})^* w, D_{i-2,j-1} + L_{i,j} + L_{i-1,j}\}$$

where w is a weighting factor.

13. An article comprising a storage medium having stored thereon
    instructions for identifying a speaker, that when executed, cause a computing platform to:
    identify endpoints of a predetermined utterance to define a test template by computing local distances between test frames and a target template and by computing accumulated distances from the local distances; wherein the local distances comprise spectral differences between spectral components of the test frames and the target template, and wherein each accumulated distance is calculated by a recursive process which selects a minimum accumulated distance from sums of a prior calculated accumulated distance and one or more of the local distances, wherein the instructions, when further executed after defining the test template based on the endpoints, cause the computing platform to perform a time warping process on the test template to authenticate the speaker.

14. The article of claim 13 wherein computing local distances comprises computing a spectral difference between vectors comprising spectral components of the test frames and vectors comprised of spectral components of the target template.

15. An article comprising a storage medium having stored thereon instructions for identifying a speaker, that when executed by a computing platform, result in:

computing local distances between test frames and a target template;

computing accumulated distances from the local distances; and identifying one or more accumulated distances below a predetermined threshold to identify endpoints of an utterance within the test frames to define a test template that includes a portion of the utterance within the endpoints, wherein the test utterance is comprised of i frames represented by i vectors, wherein the target template is comprised of j vectors, and wherein computing local distances comprises computing a spectral difference between corresponding spectral components of each vector i and each vector j to generate a i×j local distance matrix L, and the computing accumulated distances comprises computing a i×j accumulated distance matrix D substantially in accordance with the following equation:

$$D_{i,j} = \min\{D_{i-1,j-1} + L_{i,j}, D_{i-1,j-2} + (L_{i,j} + L_{i,j-1}) *0.5, D_{1-2,j-1} + L_{i,j} + L_{i-1,j}\}$$

16. A speaker verification system comprising:

a non-volatile memory to store a target template;

a processing element to compute local distances between test frames and the target template, to compute accumulated distances from the local distances, to identify one or more accumulated distances below a predetermined threshold to identify endpoints of a predetermined utterance within the test frames to define a test template, and after the endpoints are identified, to perform a time warping process on the test template and target template to authenticate a speaker; and a decision element to grant access to the speaker in response to an authentication by the time warping process, wherein the local distances comprise spectral differences between spectral components of the test frames and the target template, wherein each accumulated distance is calculated by a recursive process which selects a minimum accumulated distance from sums of a prior calculated accumulated distance and one or more of the local distances.

17. The speaker verification system of claim 16 further comprising an input element to receive an utterance from the speaker, and wherein the processing element computes the local distances by computing a spectral difference between vectors comprising spectral components of the test frames and vectors comprised of spectral components of the target template.

18. The speaker verification system of claim 17 wherein the processing element performs a dynamic time warping (DTW) process between vectors of the target template and vectors of the test template to generate a score, and when the score is smaller than a predetermined threshold, the processing element accepts the utterance as a word represented by the target template.

19. The speaker verification system of claim 16 wherein the test utterance is comprised of i frames represented by i vectors, wherein the target template is comprised of j vectors, and wherein the processing element computes local distances by computing a spectral difference between corresponding spectral components each vector i and each vector j to generate a i×j local distance matrix L.

20. The speaker verification system of claim 16 wherein the memory stores multiple target templates, and wherein the processing element aligns each of the multiple target templates to a first target template, computes local distances between each of the test frames and corresponding frames of the aligned target templates, and selects a minimum of the local distances for each of the target templates.

21. A speaker verification system comprising:

a memory to store a target template;

a processing element to compute local distances between test frames and the target template, compute accumulated distances from the local distances, to identify one or more accumulated distances below a predetermined threshold to identify endpoints of an utterance within the test frames to define a test template, and to perform a time warping process on the test template and target template to authenticate a speaker; and a decision element to grant access to the speaker in response to an authentication by the time warping process, wherein the test utterance is comprised of i frames represented by i vectors, wherein the target template is comprised of j vectors, and wherein the processing element computes local distances by computing a spectral difference between corresponding spectral components each vector i and each vector i to generate a i×j local distance matrix L, and wherein the processing element computes accumulated distances by computing a i×j accumulated distance matrix D substantially in accordance with the following equation:

$$D_{i,j} = \min\{D_{i-1,j-1} + L_{i,j}, D_{i-1,j-2} + (L_{i,j} + L_{i,j-1}) *0.5, D_{1-2,j-1} + L_{i,j} + L_{i-1,j}\}$$

22. A pattern recognition system comprising:

a local distance computing element to compute local distances between test frames and a target template;

an accumulated distance computing element to compute accumulated distances from the local distances;

an identifying element to identify one or more accumulated distances below a predetermined threshold identify endpoints of a predetermined utterance within the test frames to define a test template; and a time warping processing element to, after the test template is defined, perform a time warping process on the test template and target template to authenticate a speaker, wherein the local distances comprise spectral differences between spectral components of the test frames and the target template, wherein each accumulated distance is calculated by a recursive process which selects a minimum accumulated distance from sums of a prior calculated accumulated distance and one or more of the local distances.

23. The system of claim 22 wherein the local distance computing element computes a spectral difference between vectors comprising spectral components of the test frames and vectors comprised of spectral components of the target template.

24. The system of claim 22 wherein the time warping processing element performs a dynamic time warping (DTW) process between vectors of the target template and vectors of the test template to generate a score; and a decision element to accept the utterance as being represented by the target template when the score is smaller than a predetermined threshold.

25. The system of claim 22 further comprising a spectral coefficient extractor to extract spectral coefficients from each test frame of the utterance to generate a sequence of vectors.

26. The system of claim 25 further comprising a frame segmenting element to segment the utterance into a plurality of the test frames prior to extracting the spectral coefficients.

* * * * *

UNITED STATES PATENT AND TRADEMARK OFFICE
CERTIFICATE OF CORRECTION

PATENT NO. : 7,050,973 B2
APPLICATION NO. : 10/128725
DATED : May 23, 2006
INVENTOR(S) : Aronowitz It is certified that error appears in the above-identified patent and that said Letters Patent is hereby corrected as shown below:

In column 7, line 32, in Claim 1, after "endpoints" insert -- , --.

In column 7, line 42, in Claim 1, delete "template." and insert -- template, --, therefor.

In column 8, in line 18, in Claim 10, delete "processing" and insert -- process --, therefor.

In column 8, line 44, in Claim 12, after "comprised of" delete "i" and insert -- j --, therefor.

In column 8, line 53, in Claim 12, delete "$L_{i-1,j\}}$" and insert -- $L_{i-1,j\}}$ --, therefor.

In column 8, line 63, in Claim 13, delete "distances;" and insert -- distances --, therefor.

In column 9, line 37, in Claim 15, delete "$D_{1-2,j-1}$" and insert -- $D_{i-2,j-1}$ --, therefor.

In column 10, line 42, in Claim 21, after "and each vector" delete "i" and insert -- j --, therefor.

In column 10, line 50, in Claim 21, delete "$D_{1-2,j-1}$" and insert -- $D_{i-2,j-1}$ -- therefor.

Signed and Sealed this

Twenty-eighth Day of November, 2006

JON W. DUDAS
*Director of the United States Patent and Trademark Office*